Nov. 6, 1951        H. McCULLY        2,574,272
HOOK FOR MEASURING TAPE
Filed April 23, 1947        2 SHEETS—SHEET 1
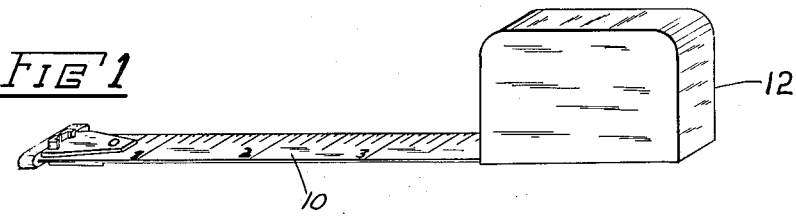
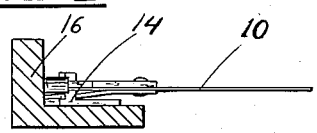
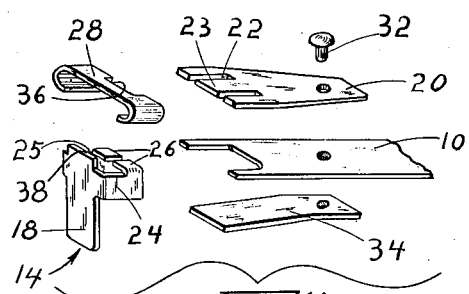
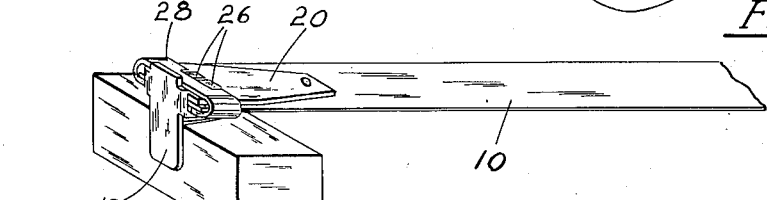
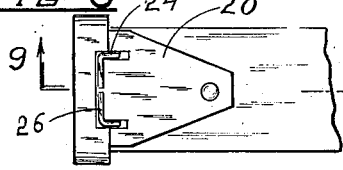
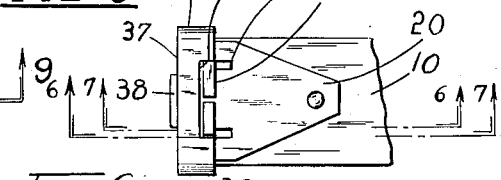
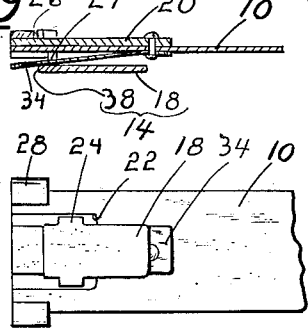
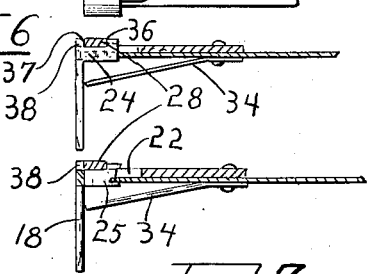
Inventor
Harry McCully
By McLaughlin & Wallenstein
Attorneys Nov. 6, 1951 H. McCULLY 2,574,272
HOOK FOR MEASURING TAPE
Filed April 23, 1947 2 SHEETS—SHEET 2
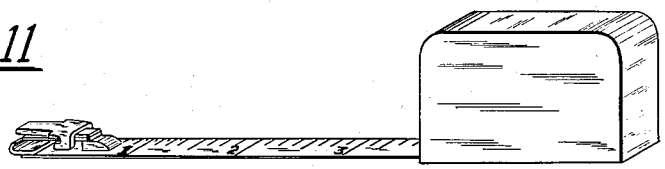
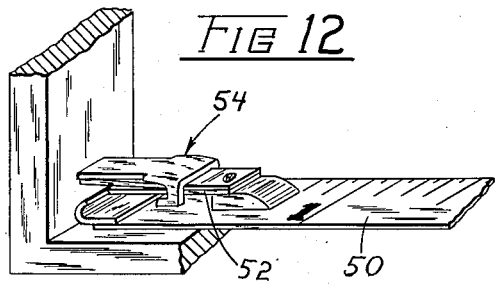
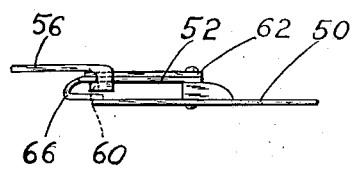
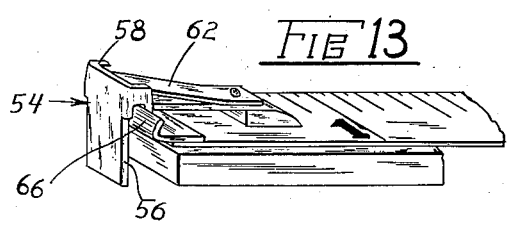
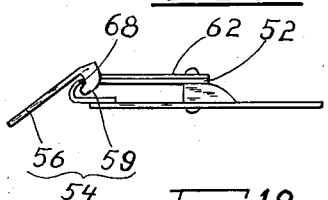
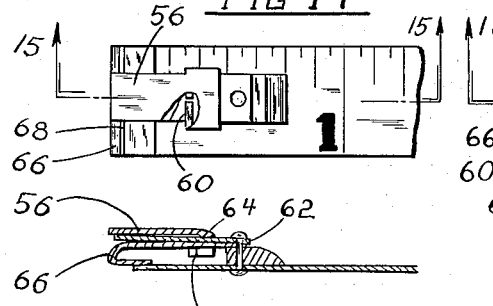
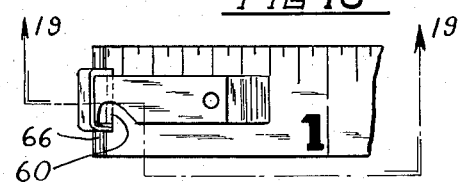
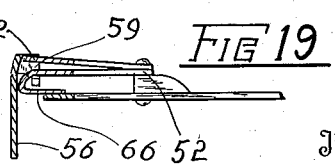
Inventor
Harry McCully
By McLaughlin & Wallenstein
Attorneys Patented Nov. 6, 1951

2,574,272

UNITED STATES PATENT OFFICE 2,574,272

HOOK FOR MEASURING TAPE

Harry McCully, Chicago, Ill.

Application April 23, 1947, Serial No. 743,295

11 Claims. (Cl. 33—137)

The present invention relates to caliper-hooks for measuring-tapes.

Fixed hooks have been used extensively on steel tapes of the type that have a slight transverse curvature that holds them stiff and straight when extended. Although a hook is useful and convenient for certain kinds of measurements it is bothersome for others. It introduces errors because it prevents the tape from lying flat on a surface and because it holds the zero point of the scale away from an abutment.

Objects of the present invention include the provision of a caliper-hook that folds against the tape to leave the end of the tape unobstructed, the provision of such a hook that is securely held in proper position when in the erect or work-engaging position, and the provision of an improved caliper-hook for measuring-tapes.

In accordance with the present invention, my improved caliper-hook comprises a tab hinged on the tape to swing from an erect or working position to a compact folded position parallel with the tape. A single spring yieldably retains the hook in the folded position but positively locks it in the working position. An arm extending inwardly from the hook extends through an aperture of the tape and carries a trunnion for supporting and retaining the hook, or a pair of such arms carrying offset-trunnions embrace a longitudinal tongue on the tape. The hook, when folded may move lengthwise of the tape, and may include a key portion that permits it to be erected only at its proper working position at the end of the tape.

These and other objects and advantages of the invention will be apparent from the following descriptions of certain embodiments thereof.

In the drawings:

Fig. 1 is an oblique view of one embodiment of the invention showing the hook folded;

Fig. 2 is an elevation thereof showing the method of making an inside, or abutment, measurement with the hook folded;

Fig. 3 is an oblique view showing the method using the erected hook for making an outside, or hook, measurement;

Fig. 4 is an exploded view of the construction of Fig. 1 showing many details of the separate parts of the assembly;

Fig. 5 is a plan view, looking down, with the hook in the erect position of Fig. 3;

Figs. 6 and 7 are sectional elevations taken along the lines 6—6 and 7—7 of Fig. 5;

Fig. 8 is a plan view looking down and showing the hook folded as in Fig. 2;

Fig. 9 is a sectional elevation taken along the line 9—9 of Fig. 8;

Fig. 10 is a plan view, looking up, showing the hook folded as in Figs. 2, 8 and 9;

Fig. 11 is an oblique view of a second embodiment of the invention;

Figs. 12 and 13 are oblique views showing the device of Fig. 11 with the hook folded and erect, respectively;

Fig. 14 is a plan view looking down in Fig. 17 showing the hook folded and retracted;

Fig. 15 is a sectional elevation taken along line 15—15 of Fig. 14;

Fig. 16 is an elevation showing the hook folded and extended;

Fig. 17 is a similar view showing the hook halfway between the folded and erect positions;

Fig. 18 is a plan view looking down showing the hook in the erect position, as in Fig. 13; and, Fig. 19 is an elevation similar to Figs. 16 and 17 showing the hook in the erect or working position.

In Figs. 1-10, inclusive, a thin, steel, graduated tape 10 of a type known heretofore has a slight transverse curvature which tends to hold the tape stiff and straight when extended. The tape is adapted to be stowed in a case 12.

The outer end of the tape 10, that is the left end, as seen in Figs. 1, 2, and 3, carries a hinged hook 14 which is adapted to be folded against the lower face of the tape 10 for permitting the end of the tape itself to be abutted against a surface such as 16 in Fig. 2 for making a so-called internal measurement. The hook is adapted also to be swung down to an erect or working position in which a tab 18 stands perpendicular to the plane of the tape 10 with its inner surface (its right surface as seen in Fig. 3) even with the end of the tape. In this position of the hook, the tab 18 is adapted to be caught over the edge of work for making an outside measurement as shown in Fig. 3.

Fig. 4 shows the separate parts of the assembly. A reenforcing piece 20 is laid over the tape 10 simply to give it added thickness and strength. It includes tongue 23 flanked by a pair of slots 22 in which the hook member 14 is supported. Extending inwardly from the tab 18 of the hook is a pair of arms 24, and offset upwardly from these arms 24, as seen in Fig. 4, is a pair of trunnion portions 26. When the hook is in the folded position, as in Figs. 8 and 9, the arms 24 extend through the slots 22 with the trunnion 26 lying atop the central tongue 23 of the reenforcing piece 20. A retaining piece 28 is clamped over the ends of the tape 10 and reenforcing piece 20, both for holding the hook 14 assembled to the tape and also for cooperating with the hook in a manner to be described presently. A rivet 32 holds the reenforcing piece 20 to the tape also holds a spring 34 which extends longitudinally outward with respect to the tape.

Figs. 5, 6 and 7 show the hook in the erect or working position. As may be seen in Fig. 5, the trunnion portions 26 of the hook fit into a notch 36 of the clamp 28. At the same time, a heel extension 38 on the hook 14 lies against the ends of tape 10 and reenforcing piece 20 and also against the outer surface 37 of the clamp 28. Thus, as long as the hook remains in the erect position, that is, with tab 18 extended perpendicular to the plane of the tape 10, the trunnion 26 and heel 38 of the hook lie on opposite sides of the member 28 so as to prevent longitudinal displacement of the hook.

Also, as may be seen best in Figs. 6 and 7, the trunnions 26 lie atop the tongue 23 of the reenforcing member 20 and the arms 24 fit up under the central portion of the member 28. This close fitting of the parts prevents the hook from rotating clockwise. At the same time the spring 34 occupies its unstressed or rest position and acts as a strut to block any counterclockwise rotation of the hook about the trunnion 26. Thus, the hook in the erect or working position is firmly held against longitudinal displacement on the tape and is also held against rotation out of that erect position.

The hook 14 is folded against the tape for making measurements as shown in Fig. 2 by pressing the spring 34 upward against the tape and folding the tab 18 inward, that is, away from the end of the tape 10. The hook then turns about the trunnions 26 into the position shown in Figs. 8, 9 and 10.

When the hook is in this folded position, the spring 34 presses down against the extreme end of the heel portion 38 of the hook and tends to rotate the hook counterclockwise and so retains it in the folded position. It is to be noted that in the erect position, for example, in Fig. 6, the heel 38 extends very little above the center line, or axis, of trunnion 26, compared to the spacing between the heel portion 38 and the trunnion 36. Consequently, when the hook is swung to the folded position the heel 38 lies well inside the end of the tape as shown in Fig. 9.

Figs. 11-19, inclusive, show another embodiment of my invention. Therein a tape 50 has a track or tongue 52 spaced slightly above the tape but parallel to it. This tongue carries a hook 54 which is adapted to be folded and retracted for leaving the end of the tape unobstructed for internal measurements, as shown in Fig. 12, and adapted to be swung to an erect or work-engaging position for external measurements as shown in Fig. 13. The hook includes work engaging tab 56 and a pair of arms 58 which extend in the inward direction when the hook is erected as in Fig. 13, or toward the tape itself when the hook is folded as in Figs. 15 and 16. These arms include offset parts 59 which carry a pair of trunnions 60 which are best seen in Figs. 14 and 15. The arms 58 embrace the tongue 52 with sufficient clearance to permit the hook to slide along it (in the longitudinal direction of the tape) and the trunnions 60 lie under the tongue 52 to hold it on the assembly. A leaf spring 62 presses upward against the tab 56 but since it presses up on the whole tab, including the portion 64 which extends to the right of the trunnion 60, as seen in Fig. 15, it does not tend to rotate the hook but tends simply to hold the hook folded and to subject the sliding motion of the hook to sufficient friction that it will, under all ordinary conditions, remain where it is put. In fact, the end portion 64 of the hook extends sufficiently far to the right of trunnion 60 to prevent any further clockwise rotation of the hook when in the folded position and so prevents the tab 56 from being swung upward as seen in Fig. 15.

The hook 54 slides easily to its extreme outer or extended position shown in Fig. 16. Here the trunnion 60 has stopped against the curved piece 66 which in the specific construction here shown is a part of the same piece of metal that forms tongue 52. Here the spring 62 still extends across the trunnion axis and so tends to hold the hook in this position with the tab 56 extended parallel to the tape 50. From the position of Fig. 16 the hook may be rotated counterclockwise through the position shown in Fig. 17 to the fully erect position shown in Fig. 19. Fig. 18 is a top view showing the hook in the same position as it appears in Fig. 19. In this position the offsets 59 of the arms 58 bear against shoulders 68 of the curved end piece 66, and the inner face of the tab 56 itself lies against the extreme outer end of this same curved piece 66 which also constitutes the extreme end of the tape when used for making measurements (Fig. 12). These abutments effectively prevent any displacement of the hook out of its correct position longitudinally of the tape. Furthermore, since the point at which the tab 56 touches the end of the curved end piece 66 lies somewhat below the point at which the offset 59 engages shoulder 68, this engagement also prevents any further counterclockwise rotation of the hook. In this position of the hook the spring 62 deflects upward to its rest position as shown in Fig. 19 and blocks any clockwise rotation of the hook. Accordingly, the hook is securely held in its erect position perpendicular to the plane of the tape and is held accurately in place at the end of the tape.

The hook may be returned to the folded position (folded but extended) of Fig. 16 by simply pressing down on the spring 62 and pushing against the working face 56 of the hook to swing it outward. In this position, the hook is ready to permit the tape to be used for an inside measurement such as that shown in Fig. 12. The mere act of placing the tape in position against the work will cause the extended end of the hook to engage the work and be forced inward to the retracted position of Fig. 15.

Although the folding hook of my present invention adds some thickness or bulk to the end of the tape, when in the folded position, it projects above or below the tape a much smaller distance when so folded than it does when in the erect or working position. Consequently, it reduces and substantially eliminates errors and inconveniences that have arisen heretofore because of the inability of the user to apply the tape to a flat surface. In this respect the construction of Figs. 11-19, inclusive, is particularly advantageous because when the hook of that device is in the folded position nothing projects below the tape. The construction of Fig. 1, on the other hand, has the advantage that the hook mechanism need not materially obscure the scale graduations by which measurements are to be made. In addition, the total thickness of the assembly of Figs. 1-10, inclusive, is slightly less.

While I have illustrated my invention by certain embodiments thereof, the detailed explanation and description of those specific constructions should not be construed as limiting except as required by the claims.

What I claim as new and desire to protect by Letters Patent of the United States is:

1. The combination with a measuring tape of a hook hinged to the tape relatively loosely on an axis transverse to the tape and parallel to the plane of the tape for swinging movement from an erect to a folded position, the tape including a transverse clamp portion and the hook including arms pivotable about said clamp portion and a tab which in the erect position extends perpendicular from said tape with the inside surface of the tab even with the end of the tape for engaging the work in an outside or hook measurement, the tab in the folded position lying approximately parallel with the tape and leaving the end of the tape free to abut the work directly for an inside or abutment measurement, and a cantilever leaf spring mounted on the tape with its free end toward said end of the tape, said spring abutting endwise against the hook to hold the tab in the erect position, said free end of the spring being deflectable out of its hook abutting position to let the spring-engaging surface of the hook fold over said spring.

2. The combination of claim 1, wherein the hinge axis is spaced from the end of the tape and wherein the leaf spring and also the spring-abutting surface of the hook extend beyond said axis so that the spring in pressing against the hook in the folded position tends to hold the hook in that position.

3. The combination with a measuring tape of a hook hinged to the tape on an axis transverse to the tape and parallel to the plane of the tape for swinging movement from an erect to a folded position parallel to the tape, the hook including a tab which in the erect position extends perpendicular from the tape with the inside surface of the tab even with the end of said tape for engaging the work in an outside measurement, said hook also including a pair of arms extending inwardly from the tab when erect, the tape having a transverse clamping member secured thereto, said arms having a trunnion portion lying adjacent said clamping member, said hook also including a heel portion which abuts the end of the tape when the hook is in erect position, said tape including an inwardly facing abutment for engaging the trunnion portion of said arm when the hook is in erect position, said heel and trunnion portion being spaced such a distance that they fit over said abutment and the end of the tape, said hook being swingable about said trunnion portions from erect position to a position at which said tab lies parallel to the tape to leave the end of the tape free to abut work directly for an inside measurement.

4. The combination with a measuring tape of a hook hinged to the tape on an axis transverse to the tape and parallel to the plane of the tape for swinging movement from an erect to a folded position parallel to the tape, the hook including a tab which in the erect position extends perpendicular from the tape with the inside surface of the tab even with the end of said tape for engaging the work in an outside measurement, said hook also including a pair of arms extending inwardly from the tab when erect, the tape having a transverse clamping member secured thereto, said arms having a trunnion portion lying adjacent said clamping member and wherein the trunnion portion of each arm is offset from said arm away from the work-engaging end of said hook, said hook being swingable about said trunnion portions from erect position to a position at which said tab lies parallel to the tape to leave the end of the tape free to abut work directly for an inside measurement.

5. The combination with a measuring tape of a hook hinged to the tape on an axis transverse to the tape and parallel to the plane of the tape for swinging movement from an erect to a folded position parallel to the tape, the hook including a tab which in the erect position extends perpendicular from the tape with the inside surface of the tab even with the end of said tape for engaging the work in an outside measurement, said hook also including a pair of arms extending inwardly from the tab when erect, said arms having an offset portion forming stops for engaging the surface of said tape for limiting the swinging movement of said hook at the erect position thereof, the tape having a transverse clamping member secured thereto, said arms having a trunnion portion lying adjacent said clamping member, said hook being swingable about said trunnion portions from erect position to a position at which said tab lies parallel to the tape to leave the end of the tape free to abut work directly for an inside measurement.

6. The combination with a measuring tape of a hook hinged to the tape on an axis transverse to the tape and parallel to the plane of the tape for swinging movement from an erect to a folded position parallel to the tape, the hook including a tab which in the erect position extends perpendicular from the tape with the inside surface of the tab even with the end of said tape for engaging the work in an outside measurement, said hook also including a pair of arms extending inwardly from the tab when erect, the tape having a transverse clamping member secured thereto, said arms having a trunnion portion lying adjacent said clamping member, said tape including a slot through which said arms and the trunnion-carrying portions thereof project, said tab and trunnions lying on opposite sides of said tape, said hook being swingable about said trunnion portions from erect position to a position at which said tab lies parallel to the tape to leave the end of the tape free to abut work directly for an inside measurement.

7. The combination with a measuring tape of a hook hinged to the tape on an axis transverse to the tape and parallel to the plane of the tape for swinging movement from an erect to a folded position parallel to the tape, the hook including a tab which in the erect position extends perpendicular from the tape with the inside surface of the tab even with the end of said tape for engaging the work in an outside measurement, said hook also including a pair of arms extending inwardly from the tab when erect, the tape having a transverse clamping member secured thereto, said arms having a trunnion portion lying adjacent said clamping member, said trunnion portion of each arm being offset from said arm toward the work-engaging end of said hook, said hook being swingable about said trunnion portions from erect position to a position at which said tab lies parallel to the tape to leave the end of the tape free to abut work directly for an inside measurement.

8. The combination with a measuring tape of a hook hinged to the tape relatively loosely on an axis transverse to the tape and parallel to the plane of the tape for swinging movement from an erect to a folded position, a track member spaced from the tape and extending lengthwise thereof, said hook in the folded position being movable along said track, the tape including a transverse clamp portion and the hook including arms pivotable about said clamp portion and a tab which in the erect position extends perpendicular from said tape with the inside surface of the tab even with the end of the tape for engaging the work in an outside or hook measurement, the tab in the folded position lying approximately parallel with the tape and leaving the end of the tape free to abut the work directly for an inside or abutment measurement.

9. The combination with a measuring tape of a hook hinged to the tape relatively loosely on an axis transverse to the tape and parallel to the plane of the tape for swinging movement from an erect to a folded position, a tongue on said tape extending lengthwise thereof, arms on said hook embracing said tongue for retaining said hook but permitting sliding movement of said hook along said tongue, and a stop for limiting outward movement of said hook to that position at which it swings into erect position in proper alignment with the end of the tape, said tape also including a transverse clamp portion and said arms being pivotable about said clamp portion and said hook including a tab which in the erect position extends perpendicular from said tape with the inside surface of the tab even with the end of the tape for engaging the work in an outside or hook measurement, the tab in the folded position lying approximately parallel with the tape and leaving the end of the tape free to abut the work directly for an inside or abutment measurement.

10. The combination with a measuring tape of a hook hinged to the tape relatively loosely on an axis transverse to the tape and parallel to the plane of the tape for swinging movement from an erect to a folded position, said tape also including a transverse clamp portion and the hook including arms pivotable about said clamp portion and a tab which in the erect position extends perpendicular from said tape with the inside surface of the tab even with the end of the tape for engaging the work in an outside or hook measurement, the tab in the folded position lying approximately parallel with the tape and leaving the end of the tape free to abut the work directly for an inside or abutment measurement, said hook in the folded position being slidable lengthwise of the tape, said hook including a portion adapted to abut the end of the tape when the hook is in the erect position, a stop limiting the outward movement of the hook to that position at which it swings into erect position in correct alignment with the end of the tape, whereby said hook can be erected only at the end of the tape and, further, is prevented from sliding when in the erect position.

11. The combination with a measuring tape of a hook hinged to the tape on an axis transverse to the tape and parallel to the plane of the tape for swinging movement from an erect to a folded position parallel to the tape, the hook including a tab which in the erect position extends perpendicular from the tape with the inside surface of the tab abutting against the end of said tape and serving to engage the work in an outside measurement, said hook also including a pair of arms extending inwardly from the tab when erect, the tape having a transverse clamping member secured thereto, each of said arms having a trunnion portion lying adjacent said clamping member, said trunnion portions extending toward each other transversely of said tape, said tape having a U-shaped slot extending inwardly from the end of the tape and forming a shoulder transverse of said tape, said shoulder being spaced from the end of the tape a distance equal to the space between said tab and each of said trunnion portions, said shoulder abutting said trunnion portions when the hook is in erect position to hold the inside surface of the hook against the end of said tape, said hook being swingable about said trunnion portions from erect position to a position at which said tab lies parallel to the tape to leave the end of the tape free to abut work directly for an inside measurement.

HARRY McCULLY.

REFERENCES CITED

The following references are of record in the file of this patent:

UNITED STATES PATENTS

| Number | Name | Date |
|---|---|---|
| 1,380,184 | Brandenberg | May 31, 1921 |
| 1,723,739 | Langsner | Aug. 6, 1929 |
| 1,798,476 | Langsner | Mar. 31, 1931 |